Feb. 26, 1935. J. S. FREEBAIRN, JR 1,992,301
AUTOMATIC LUBRICATOR FOR MOVING BEARINGS
Filed June 6, 1930 2 Sheets-Sheet 1

Inventor
James Steele Freebairn Jr.
by
Attorney.

Witness:

Feb. 26, 1935.    J. S. FREEBAIRN, JR    1,992,301
AUTOMATIC LUBRICATOR FOR MOVING BEARINGS
Filed June 6, 1930    2 Sheets-Sheet 2
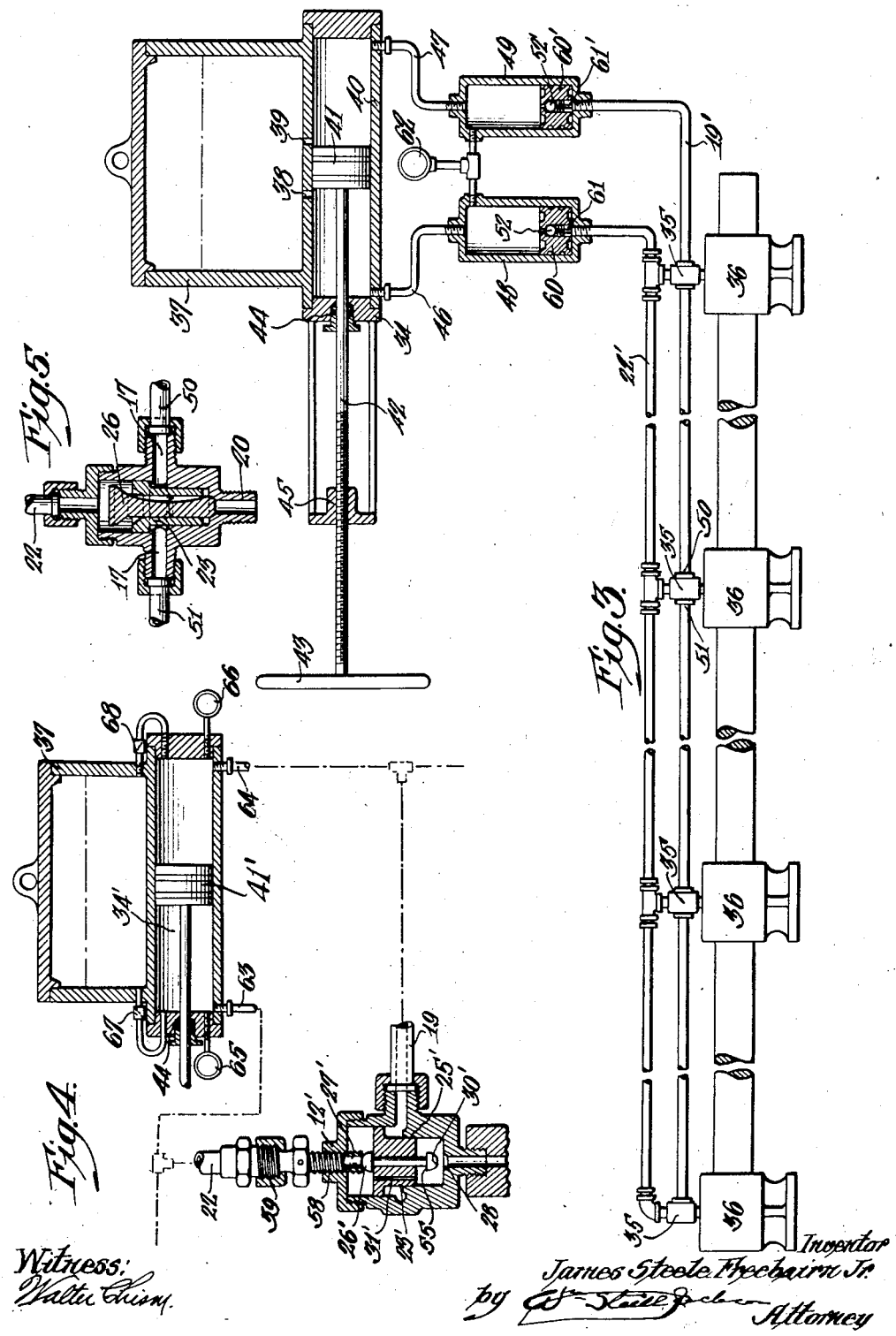

Patented Feb. 26, 1935

1,992,301

UNITED STATES PATENT OFFICE 1,992,301

AUTOMATIC LUBRICATOR FOR MOVING BEARINGS

James Steele Freebairn, Jr., Philadelphia, Pa., assignor to William Steell Jackson, Bala-Cynwyd, Pa.

Application June 6, 1930, Serial No. 459,506

16 Claims. (Cl. 184—7)

My invention relates to the lubrication of bearings, with particular reference to a system whereby lubricant may be delivered simultaneously to any desired number of bearings by moving a single master pump plunger or the like located at any convenient point.

A purpose of my invention is to propel lubricant driving means with lubricant pressure, and to retract and recharge the same also with lubricant pressure.

A further purpose is to place a plurality of lubricant delivery valves, one or more at each of a number of bearings, and to operate the valves by means of plunger pump mechanism and dual pipe lines to the valves, delivering predetermined quantities of lubricant through the different valves simultaneously by the movement of a single master pump plunger.

A further purpose is to avoid the need for springs in the retraction of a lubricant delivery valve after its discharge of lubricant.

A further purpose is to move a master pump plunger in one direction to charge any desired number of lubricant delivery valves with lubricant and to move the master pump plunger in the opposite direction to simultaneously discharge the valves of definite quantities of lubricant into the bearings intended to be lubricated by the valves.

A further purpose is to make frictional sliding connection between a stepped piston of a one-shot lubrication valve and a valve plunger adapted to close an inlet behind the piston when the piston moves in one direction and to close a discharge outlet ahead of the piston when the piston moves in the other direction, providing a throttled conduit connection between opposite ends of the piston to permit a slow passing of lubricant from ahead of the advancing piston after the closure of the inlet or outlet.

A further purpose is to provide a system of the character indicated, that is adapted to easy and inexpensive manufacture and that is well adapted to meet the needs of service.

Further purposes will appear in the specification and in the claims.

I have elected to show one main form only of my invention, showing however a few details in modified form and selecting a main form and detail modifications that are practical and efficient in operation and which well illustrate the principles involved.

Figure 3 is an assembly view in part section and partially diagrammatic, illustrating a plurality of charging valves for simultaneously lubricating a plurality of bearings along a common shaft, and including dual piping and a master plunger pump for operating the valves and with cylinder and piston traps that may be desirably inserted in the dual pipe lines between the centrally located charging pump and the lubricating valves.

Figure 1:
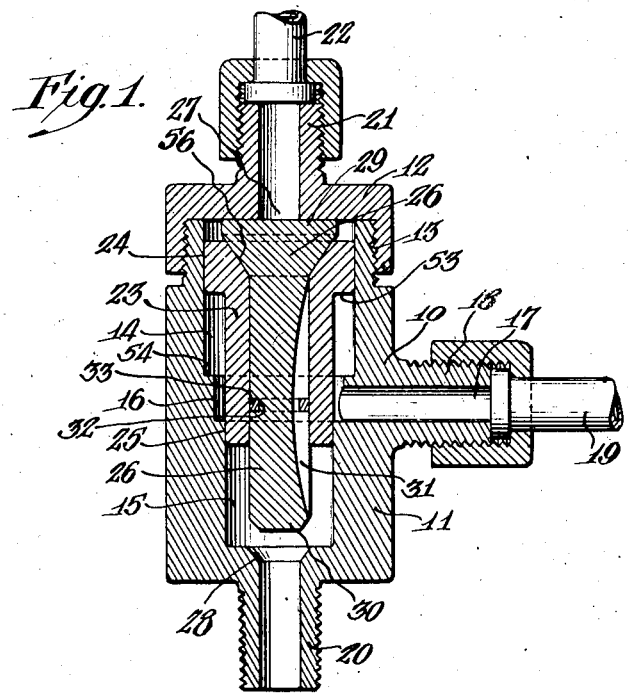
Figure 1 is a vertical section through a lubricating valve structure that embodies a chief feature of my invention, piston mechanism therein being shown in retracted position ready for discharging a shot of lubricant into any bearing with which the structure may be connected.
Figure 2:
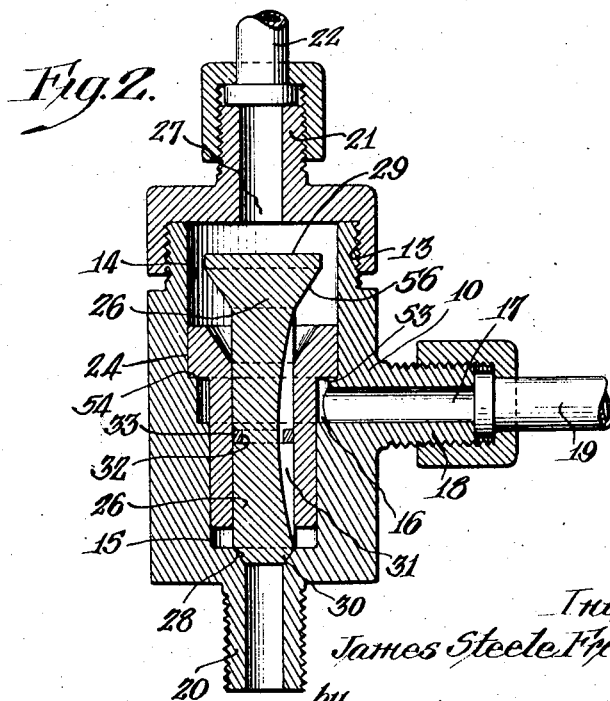
Figure 2 is a view similar to Figure 1 but showing the piston in a different position, that occupied immediately after discharge of lubricant into the bearing.

Figure 4 is a vertical section illustrating a somewhat different form of lubrication valve from that shown in Figures 1 and 2 and a somewhat different form of connection to a centrally located operating pump from that shown in Figure 3.

Figure 5 is a lubricant valve, seen in axial section, which will serve as any one of the valves 35 of Figure 3, where the line 19' must pass through the valve.

Describing in illustration and not in limitation and referring to the drawings:—

Figures 1 and 2 illustrate a one-shot lubrication valve structure in accord with my invention, the structure comprising a lubrication unit intended to be one of similar units individual to the different bearings of any machine which may operate simultaneously through dual lubrication pipe lines from a centralized plunger pump.

Each stroke of the centrally located master pump plunger in one direction discharges all of the valves into their respective bearings, and each return stroke of the plunger recharges all of the valves, leaving them ready for the next discharge when the master pump plunger is again moved in the first direction.

A stepped cylinder 10 includes a T body 11 and a cap 12 threaded at 13 to the head end of the cylinder body.

The body 11 has relatively large and small interior cylindrical portions 14 and 15 at the head and discharge ends respectively of the cylinder, with an intermediate annulus 16 which has a lateral opening 17 through a threaded shank 18 to a lubricant supply line 19.

A longitudinally bored shank 20 comprises the discharge end of the unit and is externally threaded for screwing into a suitably tapped bearing not shown, and the cap 12 carries an upwardly extended longitudinally bored shank 21 for union connection with a second lubricant supply pipe line 22.

A stepped piston 23 has a head 24 and a piston stem 25 toward the head and discharge ends of the cylinder of relatively large and small sections to respectively fit and slide along the large and small bores 14 and 15 of the body 10, and the piston 23 carries a valve plunger 26 that frictionally slides in a suitable bore through the piston.

The plunger 26 is adapted to alternately close an outer inlet 27 to the larger portion of the cylinder and a discharge outlet 28 to the bearing with which the valve is connected, the ends 29 and 30 of the plunger 26 comprising valves adapted to seat respectively upon the openings 27 and 28.

The piston is adapted to move onward longitudinally of the cylinder after the plunger 26 carried by the piston comes to rest when closing the opening 27 when moving in one direction or the opening 28 when moving in the other direction, and I provide a throttled conduit connection between opposite ends of the cylinder to permit a rearward passage of the lubricant from ahead of the onwardly moving piston when the valve is seated upon the opening 27 or 28.

In Figures 1 and 2 I show the conduit connection between the outer and inner ends of the piston as taking place through a suitable groove 31 along the valve plunger.

Obviously however, I may effect this throttled conduit connection between opposite ends of the cylinder in any suitable way, that may or may not be through the piston, as by providing an imperfect fit between the plunger 26 and the surrounding bore through the piston, or by providing a separate longitudinal bore 31' through the piston as illustrated in Figure 4.

In Figures 1 and 2 I show the valve plunger circumferentially grooved at 32 and carrying a friction ring 33 for better frictional engagement between the valve member and the piston.

In Figure 4 I have omitted this groove, contemplating a rather snug fit between the valve plunger and the bore of the piston so that the movement of the piston will frictionally move the valve whenever the valve is free to move, and be adapted to slide along the valve plunger after the latter member comes to rest.

The structure shown in Figure 4 is substantially that of Figures 1 and 2 with the exception that I show a somewhat different form of valve that does not have a definite friction ring engagement with the cylinder. Furthermore I have there provided the throttled conduit connection between the upper and lower sides of the cylinder in the form of a small bore 31' longitudinally through the piston. And I have also illustrated means for changing the quantity of lubricant discharged by each forward shot of the piston by an adjustment in the length of stroke of the valve plunger 26'.

I prefer to make the passage 31' through the piston rather than in the walls of the cylinder for manufacturing reasons only.

In Figure 3 I show a suitably located master plunger pump 34 adapted to simultaneously operate any number of one shot lubrication valves 35 individually connected to the bearings 36 for their simultaneous lubrication.

An oil or grease supply reservoir 37 opens at 38 and 39 into the interior of the master pump cylinder 40, there being a master pump piston 41 inside the cylinder that is operated by a stem 42 through a suitable handle 43, the stem passing through a gland 44 and threading through a nut 45.

Opposite ends of the cylinder are connected through pipes 46 and 47 and trap members 48 and 49 to the dual lines 22' and 19' that connect to the outer and inner inlets 21 and 18 (Figures 1 and 2) of the individual one-shot valves 35.

The body portion of the individual valves are assumed to be each adequately provided with an annulus region 16 (Figures 1 and 2) adapting each body to form a portion of the lubricant conduit line 19', the annulus as illustrated in Figure 5 having an inlet and an outlet at 50 and 51 respectively, feeding the individual valve having the annulus and the portion of the conduit line 19' that is ahead of this valve.

Each of the valves 35 is thus connected to each of the dual lines 22' and 19', both of which are maintained continuously full of lubricant.

Normally the master pump piston 41 is in mid-position as illustrated in Figure 3, the pressure in the opposite ends of the cylinder and in the dual pipe lines being then merely that incident to the head of lubricant in the supply reservoir 37.

An operator, desiring to effect simultaneous lubrication of all of the bearings, moves the master pump piston for example to the left, beyond the inlet opening 38 from the reservoir 37.

As soon as the master pump piston passes the opening 38 the pressure beyond said piston rapidly increases and the compressed lubricant is forced out of the cylinder into the line 46, thence optionally through an auxiliary trap cylinder 48 and check valve 52 to the different valves 35.

Assuming that the valves 35 are in charging position, corresponding to that shown in Figure 1, the pistons 23 will move down as pressure is applied in the line 22'.

When the plunger 26 is moved downward from the position shown in Figure 1 toward that shown in Figure 2 lubricant trapped between the downwardly presented step 53 of the piston and the annulus 16 regurgitates into the pipe line 19 throughout the downward stroke of the piston. At the same time other lubricant beneath the lower end of the stem of the piston discharges into the bearing through the discharge shank 20 until the plunger end 30 closes this outlet by engaging its valve surface upon the seat 28.

The closure of the outlet 28 takes place at any predetermined portion of the downward stroke, before the stroke has been completed, and the piston continues to move downward sliding along the plunger 26 during the remainder of the downward stroke until it comes ultimately to rest by engagement with a suitable stop. The stop may be that between the downwardly presented step 53 of the piston and an upwardly presented shoulder 54 of the annulus 16, Figure 1, or it may be against a suitable upwardly presented shoulder 55, Figure 4, upon the seated valve 30'.

During the continued downward movement of the piston after the end 30 has closed the discharge opening through 28, the lubricant ahead of the downwardly moving piston escapes upwardly through the groove 31 into the upper end of the cylinder while the step portion of the piston is continuing to discharge lubricant ahead of it into the line 19.

The result of the downward stroke has thus been the delivery of a definite quantity of lubricant through the opening 28, and an incidental delivery of lubricant by the step 53 into the line 19.

The operator now moves the master piston 41 of the central pump in reverse direction which first reduces the pressure in the pipe line 22' to subtantially zero, then increases it in the pipe line 19', forcing the pistons 23 of the charging valves upward, the pistons 23 and the valve plungers 26 moving up together until the valve heads 29 seat, closing the openings 27 to the pipe 22. The valve plungers then come to rest and the pistons continue upward, sliding along the valve stems until they engage and stopping against the lower side of the head of the valve at 56.

During the first portion of the upward movement of the pistons 23 lubricant above the pistons 24 and valve plungers 26 escapes upwardly into the pipes 22 and downwardly through the passage 31.

As soon as the valve heads 29 close upon their seats at 27, the valve plungers stop, while the pistons, continuing upward over the valve plungers, force the lubricant trapped above the pistons downward through the throttling conduit 31 into the space beneath the piston, thus leaving the body of the valve charged with lubricant for the next stroke.

Normally the lubrication of all the different bearings is effected by an operator at any desired intervals, each operation involving a reciprocation of the master plunger pump 34, first to discharge the lubrication valves into their different bearings and then to recharge them, or optionally vice versa, the return stroke discharging them to the bearings.

In the structure shown in Figures 1 and 2 I have shown definite quantities of lubricant discharged during every discharging stroke of the operating piston 23.

It is sometimes desirable to have an adjustment for the quantity of lubricant discharged into the individual bearing by each discharge stroke of the pump 34, in that the quantity of lubricant needing to be delivered to the individual bearings will vary the different lubricants according to variant characteristics thereof, and also with any relative changes in the operating conditions at the different bearings. Also the bearings may be of different sizes and so require variant lubricant charges.

In Figure 4 I show structure permitting easy adjustment in the quantity of lubricant discharged at each reciprocation of the master pump plunger.

The discharge of lubricant for each downstroke of the piston 23' is substantially equal to the stroke of the valve plunger 26' multiplied by the sectional area of the smaller portion 25' of the piston 23'.

I may make the stroke of the valve member adjustable, for example as illustrated in Figure 4, where the inlet 27' is at the inner end of a vertically adjustable nipple 58.

This nipple is adjustably threaded through the cap portion 12' of the cylinder and makes connection through a suitable union 59 with the pipe line 22.

In Figure 3 I show cylinder trap members 48 and 49 intermediate the main pump 34 and the dual pipe lines that operate the different charging valves.

Each of these cylinders is provided with a piston 60 or 60' that is longitudinally perforated at 61 or 61', the perforation carrying a check valve 52 or 52' permitting easy downward flow of lubricant into the dual pipe lines but sealing against any upward flow from the lines into the portion of the cylinders above the pistons.

During each charging stroke of the pump 34 lubricant flows from the pump into the pipe 22', thence to the charging valves, while a lesser quantity of lubricant flows back from charging valves into the pipe 19' and thence into the cylinder 49, causing the check valve 52' to close and the piston 60' to lift, sending lubricant back from the trap member 49 through the pipe 47 to the suction side of the pump 34.

During the return stroke of the pump the operation is the reverse, lubricant flowing from the pump 34 into the trap 49, thence through the valve 52' to the pipe line 19', thence to the different charging valves 35, which for a portion of the return stroke cause lubricant to regurgitate into the pipe line 22', thence back to the trap 48, closing the check valve 52 and lifting the piston 60 to return lubricant to the pump.

The traps 48 and 49 may or may not be used, their use avoiding any mixture of lubricant that has once entered any of the valves with that flowing downward from the pump 34, which is sometimes desirable, particularly if a single pump 34 is operating a great many charging valves 35.

I show a high-pressure differential gauge 62 between the trap cylinders 48 and 49 which gives an indication to the operator of the differential pressure being applied between the lines 22' and 19', but of course does not allow flow of lubricant from cylinder 48 to 49, or vice versa.

In the diagrammatic layout shown in Figure 4 the trap members 48 and 49 have been omitted, the dual lines having been connected directly at 63 and 64 into opposite ends of the pump 34.

I also show in the latter figure separate pressure gauges 65 and 66 connecting into the dual lines or into opposite ends of the pump 34 as preferred.

In Figure 3 I have provided inlet openings 38 and 39 near opposite ends of the piston 41 when the piston is in mid-position, these openings having no valves.

In Figure 4, however, I have made suitable check valve connections 67 and 68 between the pump cylinder 34' and the supply reservoir from opposite ends of the cylinder.

Any slight leakage of the check valves is immaterial, an operator maintaining movement of the piston 41' until a suitably high pressure has been maintained for an adequate short period, then reversing the movement and maintaining the desired pressure for a very short period, at the other end, the short period being such as is found adequate to insure the proper operation of all of the lubricant discharge valves.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In a lubricant delivery valve, a cylinder having a stepped interior, a piston slidably mounted therein to move inward for lubricant discharge from ahead of the piston and to retract outwardly with recharging ahead of the piston and including a head and a piston stem respectively fitting the larger and smaller bores of the cylinder, inlet lubricant connections respectively into the outer end and into the inner end of said larger bore, the head being intermediate said connections, an outlet lubricant connection from the small bore inwardly from the piston, a conduit connection between opposite ends of the cylinder, a valve adapted to open and close the outer inlet to the larger bore, a second valve adapted to open and close the outlet from the smaller bore and mechanism adapted to open the second valve at the beginning of each outward stroke of the piston, to close the first valve at an intermediate point of each of said outward strokes and to close the second valve at an intermediate point of each of the said inward strokes.

2. In a lubricant delivery valve, a cylinder having a stepped interior, a piston slidably mounted therein to move inward for lubricant discharge from ahead of the piston and to retract outwardly with recharging ahead of the piston and including a head and a piston stem respectively fitting the larger and smaller bores of the cylinder, inlet lubricant connections respectively into the outer end and into the inner end of said larger bore, the head being intermediate said connections, an outlet lubricant connection from the small bore inwardly from the piston, a conduit connection between opposite ends of the cylinder, a pair of cooperating valves operatively connected together, one being adapted to close the outer inlet to the larger bore while the second is open and the second being adapted to close the outlet from the smaller bore while the first is open, each valve opening when the other is moved toward closure and a frictional slip connection between the piston and the valves whereby the valves move with the piston during the earlier portion of each stroke, and the piston slides with respect to the valves during the later portion of each stroke, and the outer inlet to the larger bore and the outlet from the smaller bore are closed by the respective valves at an intermediate point of the respective outward and inward strokes of the piston.

3. In a lubricant delivery valve, a cylinder having a stepped interior, a piston slidably mounted therein to move inward for lubricant discharge from ahead of the piston and to retract outwardly with recharging ahead of the piston and including a head and a piston stem respectively fitting larger and smaller bores of the cylinder, inlet lubricant connections respectively into the outer end and into the inner end of said larger bore, the head being intermediate said connections, an outlet lubricant connection from the small bore inwardly from the piston, a conduit connection between opposite ends of the cylinder, a stem slidably mounted through the piston and frictionally engaging the piston and valves at the opposite ends of the stem adapted in one position to close the outer inlet to the larger bore with the outlet from the smaller bore open and in another position to close the outlet from the smaller bore with the said outer inlet to the larger bore open.

4. In a lubricant delivery valve, a cylinder having a stepped interior, a piston slidably mounted therein to move inward for lubricant discharge from ahead of the piston and to retract outwardly with recharging ahead of the piston and including a head and a piston stem respectively fitting the larger and smaller bores of the cylinder, inlet lubricant connections respectively into the outer end and into the inner end of said larger bore, the head being intermediate said connections, an outlet lubricant connection from the small bore inwardly from the piston, a conduit connection between opposite ends of the cylinder, a valve adapted to open and close the outer inlet to the larger bore, a second valve adapted to open and close the outlet from the smaller bore and means for opening the second valve at the beginning of each outward stroke of the piston, for closing the first valve at an intermediate point of each of said outward strokes, for opening the first valve at the beginning of each inward stroke and for closing the second valve at an intermediate point of each of the said inward strokes, the conduit connection between opposite ends of the cylinder comprising a longitudinal perforation through the piston.

5. In a lubricant delivery valve, a cylinder having a stepped interior, a piston slidably mounted therein to move inward for lubricant discharge from ahead of the piston and to retract outwardly with recharging ahead of the piston and including a head and a piston stem respectively fitting the larger and smaller bores of the cylinder, inlet lubricant connections respectively into the outer end and into the inner end of said larger bore, the head being intermediate said connections, an outlet lubricant connection from the small bore inwardly from the piston, a conduit connection between the opposite ends of the cylinder, a stem slidably mounted through the piston and frictionally engaging the piston and valves at the opposite ends of the stem adapted in one position to close the outer inlet to the larger bore with the outlet from the smaller bore open and in another position to close the outlet from the smaller bore with the said outer inlet to the larger bore open, the conduit connection between opposite ends of the cylinder comprising a longitudinal perforation partially closed by the stem.

6. In a lubricant delivery valve, a cylinder having a stepped interior, a piston slidably mounted therein to move inward for lubricant discharge from ahead of the piston and to retract outwardly with recharging ahead of the piston and including a head and a piston stem respectively fitting the larger and smaller bores of the cylinder, inlet lubricant connections respectively into the outer end and into the inner end of said larger bore, the head being intermediate said connections, an outlet lubricant connection from the small bore inwardly from the piston, a conduit connection between opposite ends of the cylinder, in combination with dual lubricant pipe connections to the outer and inner inlets for respectively transmitting lubricant to operate the delivery and return strokes of the piston.

7. In a lubricant delivery valve, a valve body, a valve plunger in the body moving endwise and closing an inlet or an outlet opening respectively in its limiting positions, a piston within the body and about the plunger having a stroke greater than the plunger, and a friction connection between the piston and the plunger to cause the piston to carry the plunger with it during part of its stroke.

8. In a force feed lubricating system, a valve body having an interior bore and counterbore, a stepped piston movable in said bore and counterbore, means for applying fluid pressures alternately to opposite ends of the bore to move the piston in opposite directions, a plunger within the piston providing leakage through the piston in one position, frictionally engaging the piston, and having a shorter stroke than the piston stroke, and a valved outlet whose valve is closed by movement of the plunger.

9. In a force feed lubricating system, a lubricator body including a chamber having alternative lubricating inlet connections and an outlet connection, piston means operated in opposite directions by lubricant under pressure admitted alternatively through the inlet connections, and a plunger having opposite ends comprising valves and a shorter stroke than the piston, the piston means allowing leakage from one side thereof to the other and the valves, in the limiting positions of said plunger, closing the one inlet connection and the outlet connection respectively.

10. In a force feed lubricating system, a lubricator body having a piston cylinder, two inlet connections thereto and an outlet connection, a piston movable in said cylinder and moved in opposite directions by lubricant under pressure admitted alternatively through the two inlet connections, and a plunger frictionally moved by the piston to close one inlet connection at one end of the stroke and the outlet connection at the opposite end of the stroke, and having a shorter stroke than the piston and walls forming an opening for lubricant through the piston said opening being open while the outlet connection is closed.

11. In a one-shot lubricant valve, a cylinder having a stepped interior with a lubricant inlet at the outer end into the larger bore and a lubricant outlet at the inner end out of the smaller bore and with a third a lubricant connection into the larger bore at the inner end thereof, a stepped piston slidably mounted in the cylinder intermediate the inlet and outlet ends thereof, said piston having a head and piston stem respectively fitting the larger and smaller bores, connections between the inlet and outlet ends of the cylinder, whereby each outward stroke of the piston recharges the small bore outlet end of the cylinder with lubricant displaced from the large bore by the outwardly moving piston, means for closing the connections between the inlet and outlet ends of the cylinder during the inward stroke of the piston and means for applying lubricant pressure alternately to the inlet and to the third connection.

12. In a lubricant delivery valve, a cylinder having a stepped interior, a piston slidably mounted therein to be moved inward for lubricant discharge and to retract outwardly for receiving the lubricant ahead of the piston and including a head and a piston stem respectively fitting the larger and smaller bores of the cylinder; inlet lubricant connections respectively into the outer end and into the inner end of said larger bore, the head being intermediate said connections, an outlet lubricant connection from the smaller bore inwardly from the piston, walls forming a lubricant passage between the outer end of the larger bore and the smaller bore of the cylinder, means operative during the inward stroke of the piston for closing the outlet lubricant connection, means for closing said lubricant passage during the inward movement of the piston for discharge, means for opening said lubricant passage after the means operative during the inward stroke of the piston has closed the outlet lubricant connection, means for keeping the lubricant passage open during the retraction, a lubricant pipe line connected to the inner end inlet connection of the cylinder for transmitting lubricant to effect the receiving strokes and another lubricant pipe line connected to the outer end inlet connection of the cylinder for transmitting lubricant to effect the delivery strokes.

13. A plurality of lubricant delivery valves each having a cylinder, a piston in each cylinder, the piston having lubricant delivery strokes in one direction and lubricant receiving strokes in the other direction, the said piston strokes being respectively in the one direction to effect deliveries of lubricant out of one end of the cylinder to bearings or the like and in the other direction to charge the said one end of the cylinder with fresh lubricant, a lubricant pipe line connected to each cylinder for transmitting lubricant to effect the receiving strokes of all the valves, another lubricant pipe line connected to each cylinder for transmitting lubricant to effect the delivery strokes of all the valves, and pump means for effecting lubricant pressure alternately in the pipe lines, the said lines being connected to a pump cylinder at portions thereof on opposite sides of a pump piston whereby each pump stroke in one direction transmits pressure and suction to the respective lines and the reverse stroke of the pump transmits suction and pressure to the respective lines, and each stroke of the valve piston is due to the differential pressure between the said lines.

14. A plurality of lubricant delivery valves each having a cylinder, a piston in each cylinder, the piston having lubricant delivery strokes in one direction and lubricant receiving strokes in the other direction, the said piston strokes being respectively in the one direction to effect deliveries of lubricant out of one end of the cylinder to bearings or the like and in the other direction to charge the said one end of the cylinder with fresh lubricant, a lubricant pipe line connected to each cylinder for transmitting lubricant to effect the receiving strokes of all the valves and another lubricant pipe line connected to each cylinder for transmitting lubricant to effect the delivery strokes of all the valves, pump means connected to the lines for effecting lubricant pressure alternately in the pipe lines, a pressure cylinder in one of the lines between the pump and the valves, a piston in the pressure cylinder, a conduit connection between opposite ends of the pressure cylinder and a check valve in said connection permitting flow from the pump through said check valve and preventing a reverse flow from the valve to the pump.

15. A plurality of lubricant delivery valves each having a cylinder, a piston in each cylinder, the piston having lubricant delivery strokes in one direction and lubricant receiving strokes in the other direction, the said piston strokes being respectively in the one direction to effect deliveries of lubricant out of one end of the cylinder to bearings or the like and in the other direction to charge the said one end of the cylinder with fresh lubricant, a lubricant pipe line connected to each cylinder for transmitting lubricant to effect the receiving strokes of all the valves and another lubricant pipe line connected to each cylinder for transmitting lubricant to effect the delivery strokes of all the valves, pump means connected to the pipe lines for effecting lubricant pressure alternately in the pipe lines, a pair of pressure-transmitting cylinders, one in and forming a portion of each of the lines and therefore connecting from one end through one portion of the line to the pump and from the other end through the other portion of the line to the valves, each pressure transmitting cylinder having a floating piston and a check valve connection through the floating piston adapting the lubricant to flow through the check valve from the pump and preventing reverse flow through the check valve to the pump.

16. In a force feed lubricating system, a cylinder having a bore and counterbore, a piston therein having ends fitting the respective bores, inlet and outlet conduit connections with the cylinder respectively to opposite ends of the counterbore, means for reversely varying the pressures in the said connections to operate the piston in successively reverse directions and to supply lubricant to the cylinder at the counterbore portion thereof, a plunger valve within the piston frictionally slidable therewith and adapted during the said sliding to permit passage of lubricant between the piston and plunger and to close said passage when the valve is at its inmost position with respect to the piston, and the cylinder having an outlet port from its bore closed by the valve in the inmost position thereof.

JAMES STEELE FREEBAIRN, Jr.